United States Patent [19]
Keuerleber et al.

[11] Patent Number: 5,829,122
[45] Date of Patent: Nov. 3, 1998

[54] METHOD OF PRODUCING ELECTROMAGNETIC VALVE

[75] Inventors: Horst Keuerleber, Eberdingen; Werner Brehm, Hemmingen; Walter Fleischer, Stuttgart; Kurt Gensheimer, Bad Liebenzell, all of Germany

[73] Assignee: Robert Bosch GmbH, Stuttgart, Germany

[21] Appl. No.: 552,579

[22] Filed: Nov. 3, 1995

[30] Foreign Application Priority Data

Nov. 3, 1994 [DE] Germany ............... 44 39 235.4
Oct. 10, 1995 [DE] Germany ............. 195 37 656.0

[51] Int. Cl.$^6$ ..................................................... H01F 41/00
[52] U.S. Cl. .................. 29/602.1; 29/511; 239/585.5; 251/129.21
[58] Field of Search ................... 29/602.1, 511; 239/585.5; 251/129.21

[56] References Cited

U.S. PATENT DOCUMENTS

| 4,610,080 | 9/1986 | Hensley | ............... 29/602.1 |
| 5,289,627 | 3/1994 | Cerny et al. | .......... 29/602.1 |

*Primary Examiner*—Carl E. Hall
*Attorney, Agent, or Firm*—Michael J. Striker

[57] ABSTRACT

A method of producing an electromagnetic valve includes deep drawing of a magnet housing, arranging a magnet coil, a magnet core and a plunger connected with an armature in the magnet housing, connecting a valve closing element which has a valve element for controlling a pressure medium flow, with the magnet housing by flanging a flared flange with a shoulder of the magnet housing relative to the valve closing element, and producing both the flared flange and the shoulder during the deep drawing of the magnet housing in a non-material-removing deformation step.

7 Claims, 3 Drawing Sheets

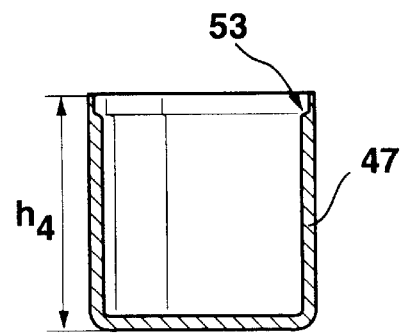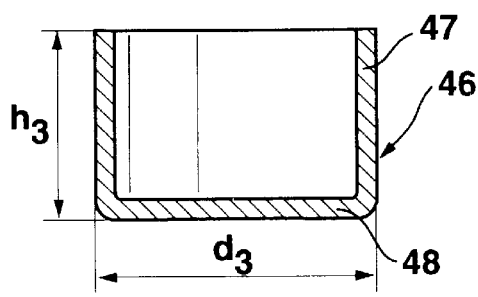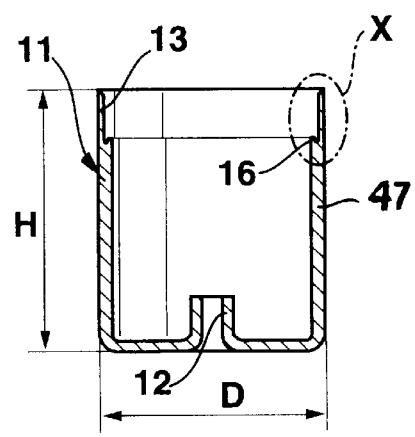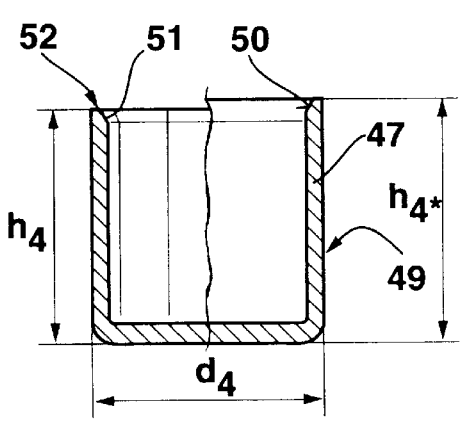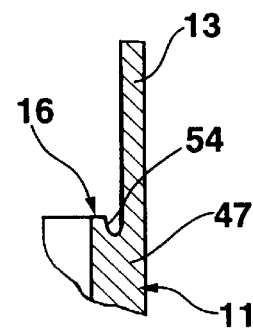

METHOD OF PRODUCING ELECTROMAGNETIC VALVE

BACKGROUND OF THE INVENTION

The present invention relates to a method of producing an electromagnetic valve.

Electromagnetic valves which usually are composed of a magnet part and a vale closing element are produced so that a magnet housing of the magnet part is made by deep drawing or in other words without a material removal. When the magnet housing is so made, a flared flange with a circular shoulder is formed in its casing by turning. In order to obtain a perpendicular transition despite the wear of the rotary tool in the region between the shoulder and the flared flange, a recess is formed in an additional manufacturing step, such as for example by turning. The thusly produced magnet housing is then provided with the components of the magnet part. Jetting of the magnet housing with synthetic plastic material is performed in some cases. In order to connect the valve closing element with the magnet part or the magnet housing, the valve closing element is inserted in the region of the flared flange into the magnet housing. For low friction support of the armature between the magnet housing and the valve closing element, a diaphragm spring is inserted and abuts against the shoulder of the magnet housing. Then the flared flange of the magnet housing is flanged over relative to the valve closing element, and the desired connection between the magnet housing and the valve closing element is obtained. The disadvantage of the known manufacturing process is that the magnet housing is relatively expensive to manufacture in view of the flared flange with the shoulder produced in a material removing manner and in view of the recess which also is produced in a material-removing manufacturing step.

SUMMARY OF THE INVENTION

Accordingly, it is an object of the present invention to provide a method of producing an electromagnetic valve, which avoids the disadvantages of the prior art.

In keeping with these objects and with others which will become apparent hereinafter, one feature of the present invention resides, briefly stated, in a method of producing an electromagnetic valve in which a magnet coil, a magnet core and a plunger connected with an armature are located in a magnet housing made in a deep drawing process, and a valve closing element including a valve element for controlling a pressure medium flow is connected by flanging of a flared flange of the magnet housing with the shoulder, wherein in accordance with the present invention both the flared flange and the shoulder are made during the deep drawing process of the magnet housing in a non-material-removing deformation process.

When the method is performed in accordance with the present invention, the magnet housing can be produced in a simple and cost favorable manner.

Since the flared flange and the shoulder are formed during the deep drawing process of the magnet housing in a non-material, removing manner, no retrofitting and retooling works are needed.

The magnet housing is produced in an especially price favorable and accurate manner when also the recess is formed in a non-material, removing manner during the deep drawing process of the magnet housing, in accordance with the present invention.

In accordance with a further feature of the present invention, a material with low coercive field intensity can be used for the magnet housing. This either improves the electromagnetic properties of the electromagnetic valve, or due to greater manufacturing tolerances of the components of the magnetic circuit provides for a simpler and therefore more price favorable production of the electromagnetic valve.

Still another feature of the present invention is that the recess can be formed with an outwardly displaced flared flange. With this feature, a longer tool service life is provided.

Finally, a longitudinal slot can be formed in the flared flange. Therefore an especially low flanging force is needed for connecting the magnet housing with the valve closing element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2–6 are views showing different phases of manufacture of a magnet housing of the inventive electromagnetic valve, in schematic illustration;

FIG. 7 is a view showing a fragment X of FIG. 6;

DESCRIPTION OF THE PREFERRED EMBODIMENTS

Figure 1:
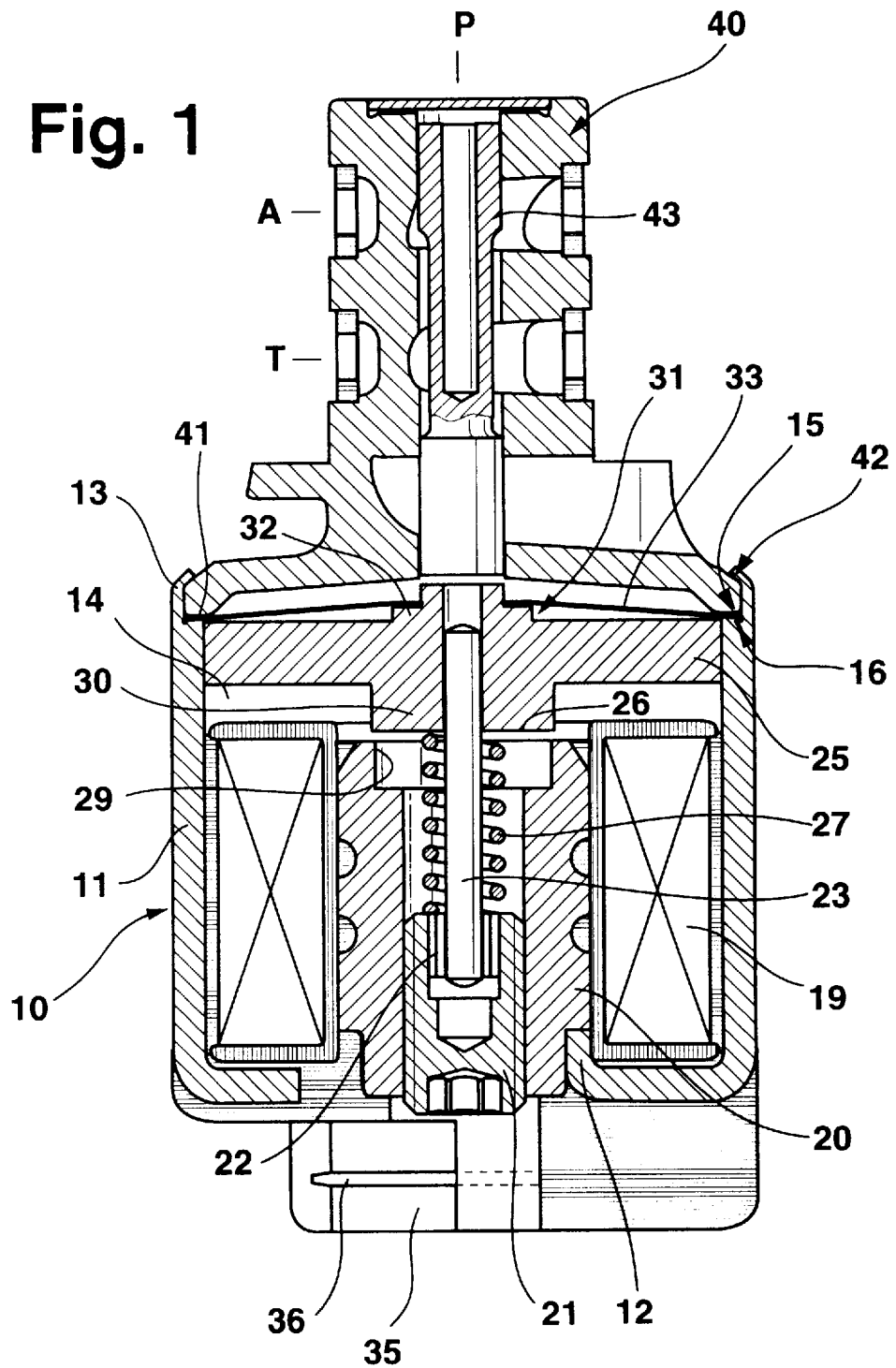
FIG. 1 is a view showing a longitudinal section of an electromagnetic valve in accordance with the present invention.

An electromagnetic valve shown in FIG. 1 is arranged, for example, in an automatic transmission of a motor vehicle and controls in a known manner a pressure medium flow to a not shown consumer. The electromagnetic valve has a magnet part 10 with a magnet housing 11. The magnet housing 11 produced by a deep drawing process has one end provided with a bottom 12 having a U-shape in a longitudinal section, and an opposite end provided with a circular flared flange 13. A cylindrical depression 15 with a circular shoulder 15 is formed in the region of the flared flange 13 in an inner chamber 14 of the magnet housing 11. Moreover, a magnet core 19 is arranged in the inner chamber 14 of the magnet housing 11 and surrounds a substantially sleeve-shaped magnet core 20. An adjusting screw 21 for adjusting the characteristic of the electromagnetic valve is inserted in the magnet core 20. A sliding bearing 22 is arranged in the adjusting screw 21, and a plunger 23 is slidingly guided in the sliding bearing.

An armature 25 is fixedly connected with the plunger 23, and a helical spring 27 abuts against a lower side 26 of the armature 25. The helical spring abuts against an end side of the sliding bearing 22. A cylindrical depression 29 is formed in the magnet core 20 at the side which is opposite to the adjusting screw 21. A projection 30 of the armature 25 is inserted in the depression. An extension 32 is formed on the upper side 31 of the armature 25 and connected with the diaphragm spring 33. The diaphragm spring plainly abuts against the shoulder 16 and extends to the flared flange 13 of the magnet housing 11.

A synthetic plastic material is injected in the electromagnetic valve which has been pre-mounted from the above described components, and in particular in the region of the bottom 12 of the magnet housing 11. The synthetic plastic material fills the intermediate space in the inner chamber 14 between the magnet housing 11, the magnet coil 19 and the magnet core 20. Therefore, a good heat withdrawal is provided during the operation of the electromagnetic valve. Simultaneously, a plug 35 is formed on the outer side of the magnet housing 11, and terminal prongs 36 for the magnet coil 19 are arranged in the plug. A valve closing element 40 is inserted in the depression 15 of the magnet housing 11 without a radial gap. Its ring-shaped lower side 41 abuts against the membrane diaphragm 33. The valve closing element 40 is fixedly connected with the magnet part 10 or the magnet housing 11. In particular, the flared flange 13 of the magnet housing 11 is flanged over relative to the outer surface 42 of the valve closing element in the region of the depression 15.

The valve closing element 40, which for example is composed of synthetic plastic material, is provided with passages for a pressure medium and connections for connecting the valve closing element 40 with a consumer A, a pressure medium source P and a return container T. Depending on the hydraulic pressure provided by the pressure medium source P, the spring force of the spring 27 and the current of the magnet coil 19, the pressure medium flow in the hydraulic system is controlled by a valve slider 43 cooperating with the plunger 23. Instead of the slider 43, other actuating elements or valve elements can be used for the pressure medium control, such as for example a seat valve or a ball valve. Also, the magnet part 10 of the electromagnetic valve can have a construction which is different from the construction shown in the present example.

The important feature of the present invention is the manufacturing process for producing the magnet housing 11, which is shown in FIGS. 2–6. In a first deep drawing step, a bucket-shaped blank housing 46 is produced from a round member 45 as shown in FIG. 3. The deep drawing reduces the wall thickness of the casing 46 relative to the thickness of the bottom 48 of the blank housing 46, for example by approximately 20%. In a second deep drawing step shown in FIG. 4, the outer diameter $d_4$ of the intermediate housing 49 is reduced relative to the outer diameter $d_3$ of the blank housing 46 on the one hand, and the excessive material produced due to the reduced outer diameter $d_4$ is collected from the region of the original bottom 38 of the blank housing 46 in the region of the casing 47 of the intermediate housing 49 on the other hand. Therefore the height $h_4$ of the intermediate housing (right part of FIG. 4) is greater than the corresponding height $h_3$ of the blank housing 46. Furthermore, a so-called indent 50 is formed by a specially shaped deep drawing tool during the second deep drawing step in the region of the later flared flange 13. The indent 50 forms an inclinedly extending casing inner wall 51 in this region. After the second deep drawing step, the height of the casing 47 is reduced for example by knocking down to a size $h_4$ (left part of FIG. 4). Thereby the casing inner wall 51 extended in the upper end in a pointed manner is flanged, so that a plain upper side 52 is produced.

During the subsequent third deep drawing step shown in FIG. 5, the wall thickness of the wall 47 is further reduced, and the excessive material causes growing of the height of the casing 47. Simultaneously, an intermediate shoulder 53 is impressed by correspondingly shaped punch, and then the casing height is again reduced to the size $h_4$.

A fourth and last deep drawing step for manufacturing of the magnet housing 11 is shown in FIG. 6. In this manufacturing step the outer diameter D of the magnet housing 11 is brought to the final size and the U-shaped drawn bottom 12 is formed. Furthermore, the wall thickness of the casing 47 is further reduced in the region of the flared flange 13, and thereby the height of the magnet housing 11 grows to the final size H. Simultaneously a recess 54 is impressed in the region of the shoulder 16 as shown in FIG. 7, and the distance Y between the shoulder 16 and the drawn bottom 12 is adjusted.

During the above described manufacturing process the flared flange 13, the shoulder 16, and the recess 54 are produced in a non-material-removing process during the manufacture of the magnet housing 11.

Figure 8:
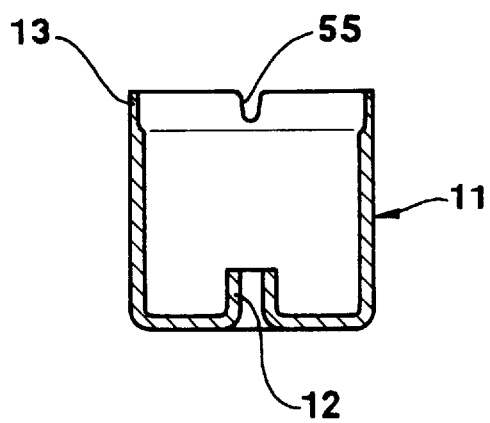
FIG. 8 is a view showing a magnet housing in accordance with another embodiment in accordance with the present invention, in a longitudinal section.

In a different embodiment of the invention shown in FIG. 8, a longitudinal slot 55 is formed in the flared flange 13 and has the maximum height of the flared flange 13. Due to the longitudinally-slotted flared flange 13, the displacement of the flared flange 13 relative to the casing surface 42 of the valve closing element 40 for the mounting needs only low flanging force. For further reduction of the flanging force, several longitudinal slots 55 can be formed in the flared flange 13. Preferably they are arranged at uniform angular distances around the longitudinal axis of the magnet housing 11. The formation of the longitudinal slots 55 can be performed simultaneously with one of the manufacturing steps during production of the magnet housing 11, preferably during the fourth deep drawing step shown in FIG. 6. It is also possible to provide additionally a separate manufacturing step for the longitudinal slots.

Figure 9:
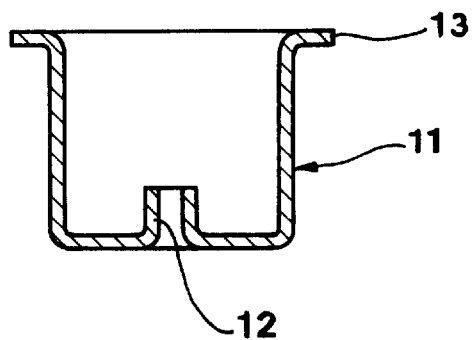
FIG. 9 is a view showing a magnet housing during a manufacturing process in accordance with the second embodiment of the present invention, in a longitudinal section.

In the second different embodiment of the invention shown in FIG. 9, the flared flange 11 preferably is turned away at right angle outwardly of the magnet housing 11. The turning is performed during the second deep drawing step shown in FIG. 4. After the turning of the flared flange 13, the exact shaping of the flared flange 13 and the impressing of the recess 54 can be performed by a corresponding shaping tool. The reorientation of the flared flange 13 is performed either simultaneously with the formation of the bottom 12, or during connection of the magnet housing 11 with the valve closing element 40 by a correspondingly shaped flanging tool. In the second different embodiment, the surface life of the tool for the recess 54 is increased so that improved manufacturing tolerances can be obtained. It is to be understood that additionally the feature of the longitudinally-slotted flared flange 13 of the first different embodiment of FIG. 8 can be also used in the second different embodiment.

Finally, it should be mentioned that due to the wall thickness reduction in the region of the flared flange 13 of the magnet housing 11, the outer diameter D of the magnet housing 11 is constant over its whole height H. Therefore, an especially compact electromagnetic valve is provided.

Among materials which are suitable for deep drawing during the manufacture of the magnet housing 11, the material RFe80 is especially good. It is not only relatively price favorable, but also it has a low coercive field intensity, in particular smaller than 100 A/cm. This means that with respect to the magnetic circuit of the electromagnetic valve, it has especially favorable magnetic properties. It is therefore possible to obtain a high magnetic force even with relatively great manufacturing or size tolerances of the components of the magnetic circuit, such as for example the magnet core 20 and the armature 25, which usually lead to a high working air gap. It should also be emphasized that with this material, not only the magnet housing 11 can be produced simply, but also with normal manufacturing tolerances an especially high grade magnetic circuit is provided. On the other hand, with normal manufacturing tolerances and with the same magnetic force, an especially compact construction of the electromagnetic valve is obtained. If a high-grade magnetic circuit is not required in the electromagnetic valve, the manufacturing or size tolerances of the components of the magnetic circuit can be increased, and therefore the electromagnetic valve can be produced in a simple and price favorable manner.

It will be understood that each of the elements described above, or two or more together, may also find a useful application in other types of methods differing from the types described above.

While the invention has been illustrated and described as embodied in a method of producing an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing an electromagnetic valve, comprising the steps of deep drawing of a magnetic material member to form a magnet housing; arranging a magnet coil, a magnet core and a plunger connected with an armature in the magnet housing; connecting a valve closing element which has a valve element for controlling a pressure medium flow, with the magnet housing by flanging a flared flange with a shoulder of the magnet housing relative to the valve closing element; and producing both the flared flange and the shoulder during the deep drawing of the magnet housing in a non-material-removing deformation step.

2. A method as defined in claim 1; and further comprising the step of forming a recess in a transitional region between the flared flange and the shoulder.

3. A method as defined in claim 2; wherein said step of forming of the recess includes forming the recess in a non-material removing step in the magnet housing.

4. A method as defined in claim 1, wherein said step of deep drawing of the magnet housing includes four sequential deep drawing steps.

5. A method as defined in claim 4; and further comprising the step of forming a longitudinal slot in the region of the flared flange during one of the deep drawing steps.

6. A method as defined in claim 2; and further comprising the step of outwardly turning the flared flange from the magnet housing before the forming of the recess.

7. A method as defined in claim 1; and further comprising the step of making the magnet housing from a material with a coercive field intensity less than 100 A/cm.

* * * * *